United States Patent Office 3,792,054
Patented Feb. 12, 1974

3,792,054
DIACYLOXY-BENZOIC ACID ANILIDES
Heinrich Rushig, Bad Soden, Taunus, Dieter Duwel, Hofheim, Taunus, and Johann Konig, Niederhofheim, Taunus, Germany, assignors to Farbwerke Hoechst Aktiengesellschaft vormals Meister Lucius & Bruning, Frankfurt am Main, Germany
No Drawing. Original application June 5, 1970, Ser. No. 43,949. Divided and this application May 31, 1972, Ser. No. 258,431
Claims priority, application Germany, June 9, 1969, P 19 29 150.0
Int. Cl. C07d 29/30
U.S. Cl. 260—293.64         5 Claims

ABSTRACT OF THE DISCLOSURE

Diacyloxy-benzoic acid anilides of the general formula

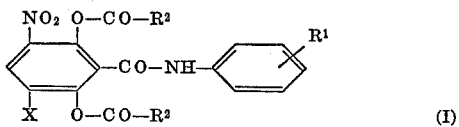

(I)

in which
X represents hydrogen or halogen,
$R^1$ represents 1 to 3 nitro groups, trifluoromethyl groups and/or halogen atoms,
$R^2$ represents hydrogen; lower alkyl which may be substituted by halogen, lower alkoxy or phenyl; alkenyl having 3 to 6 carbon atoms; cycloalkyl having 4 to 6 carbon atoms; phenyl; an unsaturated heterocyclic 5- or 6-membered ring; alkyl-amino or dialkyl-amino in which the alkyl groups each contain 1 to 4 carbon atoms or may form together with the nitrogen atom a pyrrolidine, piperidine, morpholine or N-methyl-piperazine ring.

---

This is a division of application Ser. No. 43,949 filed June 5, 1970.

The present invention provides diacyloxy-benzoic acid anilides of the general formula

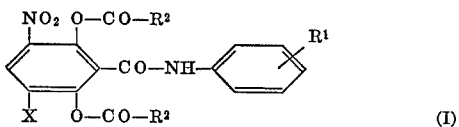

(I)

in which
X represents hydrogen or halogen,
$R^1$ represents 1 to 3 nitro groups, trifluoromethyl groups and/or halogen atoms,
$R^2$ represents hydrogen; lower alkyl which may be substituted by halogen, lower alkoxy or phenyl; alkenyl having 3 to 6 carbon atoms; cycloalkyl having 4 to 6 carbon atoms; phenyl; an unsaturated heterocyclic 5- or 6-membered ring; alkylamino or dialkyl-amino in which the alkyl groups each contain 1 to 4 carbon atoms or may form together with the nitrogen atom a pyrrolidine, piperidine, morpholine or N-methyl-piperazine ring.

The invention furthermore provides a process for preparing the above-specified compounds, wherein dihydroxy-benzoic acid anilides of the general formula

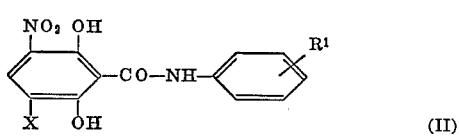

(II)

in which X and $R^1$ have the meanings given above, are acylated.

For this reaction, there may be used as starting material for example the following dihydroxy-benzoic acid anilides:

3-nitro-2,6-dihydroxy-benzoic acid-4'-chloroanilide,
3-nitro-2,6-dihydroxy-benzoic acid-4'-bromoanilide,
3-nitro-2,6-dihydroxy-benzoic acid-4'-iodoanilide,
3-nitro-2,6-dihydroxy-benzoic acid-2',4'-dichloroanilide,
3-nitro-2,6-dihydroxy-benzoic acid-3',4'-dichloroanilide,
3-nitro-2,6-dihydroxy-benzoic acid-2',6'-dichloroanilide,
3-nitro-2,6-dihydroxy-benzoic acid-2',5'-dichloroanilide,
3-nitro-2,6-dihydroxy-benzoic acid-2',4',6'-tri-chloro-anilide,
3-nitro-2,6-dihydroxy-benzoic acid-2',4',6'-tribromo-anilide,
3-nitro-2,6-dihydroxy-benzoic acid-3'-tri-fluoromethyl-anilide,
3-nitro-2,6-dihydroxy-benzoic acid-3',5'-bis-trifluoromethylanilide,
5-chloro-3-nitro-2,6-dihydroxy-benzoic acid-3',5'-bis-trifluoromethylanilide,
5-bromo-3-nitro-2,6-dihydroxy-benzoic acid-3',5'-bis-trifluoromethylanilide,
5-iodo-3-nitro-2,6-dihydroxy-benzoic acid-3',5'-bis-trifluoro-methylanilide.

These compounds may be prepared for example by the reaction of corresponding X-substituted 3-nitro-2,6-dihydroxy-benzoic acid esters with $R^1$-substituted anilines.

The acylation of the two phenolic hydroxyl groups is effected in known manner by the action of acylating agents. For this purpose, carboxylic acids or their reactive derivatives, for example acid anhydrides, acid halides, especially acid chlorides, as well as reactive derivatives of carbamic acid and isocyanates are suitable. For example, the above-mentioned derivatives of the following carboxylic acids may be used: acetic acid, propionic acid, butyric acid, isobutyric acid, valeric acid, caproic acid, β-chloro-propionic acid, β,α-dichlorobutyric acid, β-methoxy-propionic acid, phenylacetic acid, phenylpropionic acid, α-pehnyl-isobutyric acid, acrylic acid, crotonic acid, 2-hexenic acid, cyclopentanoic acid, cyclohexanoic acid, benzoic acid, 2-thiophen-carboxylic acid, pyrrol-2-carboxylic acid, pyromucic acid, picolinic acid, nicotinic acid, thiazol-4-carboxylic acid.

For reacting the starting materials, the reaction components may be allowed to react directly with one another. In order to facilitate the acylation it is often of advantage to add a basic or acidic condensation agent. Suitable basic compounds are, for example tertiary amines such as pyridine or triethylamine. As acidic condensation agents, for example sulfuric acid, sulfonic acids, polyphosphoric acids or anhydrous zinc chloride may be used. Furthermore, it is of advantage to carry out the reaction of the dihydroxy-benzoic acid anilides in the presence of a solvent or diluent. For this purpose, inert polar or non-polar solvents such as benzene, toluene, chlorobenzene, methylene chloride, chloroform, acetone, dibutyl ether, tetrahydrofurane, dioxane, dimethylformamide or tetramethylene-sulfone may be used. If the acylating agent used is a liquid, it may be employed in excess and therewith serve as a diluent. The same applies to condensation agents, for example pyridine.

The acylation reaction takes place at room temperature or at slightly elevated temperatures. In general, the boiling temperature of the solvent used is not to be exceeded. In most cases, the reaction is complete after a few hours. The products of the invention can be isolated, for example by removing the diluent by distillation or by the addition of water and following crystallization from a suitable solvent.

The novel diacyloxy-benzoic acid anilides constitute, in general, crystalline colorless compounds which do not dissolve or dissolve sparingly only in water. They are distinguished by a marked anthelmintic activity. This activity is especially directed against liver flukes, in particular against the great liver flukes *Fasciola hepatica*. In practice, the infestation of productive animals such as sheep and cattle with liver flukes has considerable importance. In combating these infestations, the products of the invention have proved to be valuable chemo-therapeutic agents. They can be applied perorally or subcutaneously, the mode of administration depending on the individual case. The following table lists the doses of some products of the invention whose single administration to naturally strongly infested sheep resulted in complete cessation of the excretion of eggs and to a complete liberation of the animals from liver flukes.

TABLE.—CHEMOTHERAPEUTICAL TEST

[Host: sheep. Parasite: *Fasciola hepatica*]

| Substance | Mode of administration | Therapeutic dose (mg./kg. body weight) |
|---|---|---|
| 3-nitro-2, 6-diacetoxy-benzoic acid-3', 5'-bis-trifluoromethyl-anilide. | S.c. | 2 |
|  | P.o. | 8 |
| 3-nitro-2, 6-dicapronyloxy-benzoic acid-3', 5'-bis-trifluoromethyl-anilide. | S.c. | 5 |
|  | P.o. | 10 |
| 3-nitro-2, 6-di-(N-methyl-carbamyloxy)-benzoic acid-3', 5'-bis-trifluoromethyl-anilide. | S.c. | 5 |
|  | P.o. | 10 |
| 3-nitro-2, 6-bis-(N,N-diethyl-carbamyloxy)-benzoic acid-3', 5'-bis-trifluoromethyl-anilide. | P.o. | 15 |
| 5-iodo-3-nitro-2, 6-diacetoxy-benzoic acid-4'-chloroanilide. | P.o. | 5 |

NOTE.—P.o.=peroral administration. S.c.=subcutaneous administration.

The indicated doses were tolerated by the animals without side effects.

Hence, the novel compounds are valuable medicaments in veterinary medicine for combating liver fluke infestations.

The following examples illustrate the invention:

EXAMPLE 1

3-nitro-2,6-diacetoxy-benzoic acid-4'-chloroanilide 15.5 g. of 3-nitro-2,6-dihydroxy-benzoic acid-4'-chloroanilide, 40 ml. of acetanhydride and 3 drops of concentrated $H_2SO_4$ were heated together for 70 minutes to 85° C. After cooling, 120 ml. of water were added, the crystals that had precipitated were filtered off with suction, washed with 50 ml. of water, dried and recrystallized from benzene. 15.2 g. of 3-nitro-2,6-diacetoxy-benzoic acid-4'-chloroanilide, melting at 144° C., were obtained.

EXAMPLE 2

(a) 3-nitro-2,6-diacetoxy-benzoic acid-3',5'-bis-trifluoromethylanilide 60 g. of 3-nitro-2,6-dihydroxy-benzoic acid-3',5'-bis-trifluoro-methylanilide, 110 ml. of acetanhydride and 10 ml. of acetyl chloride were heated together for 3.5 hours to 90° C. The solution was evaporated under reduced pressure and the oily residue was dissolved in twice its volume of benzene. After evaporation of this solution, a solid residue was obtained which was recrystallized first from benzene, then from methanol. 46 g. of 3-nitro-2,6-diacetoxy-benzoic acid - 3',5' - bis-trifluoro-methylanilide were obtained. Melting point: 169–170° C.

In analogous manner, there was obtained:

(b) 3-nitro-2,6-dipropionyloxy-benzoic acid-3,5'-bis-trifluoromethylanilide; melting point 149° C.

EXAMPLE 3

3-nitro-2,6-dicapronyloxy-benzoic acid-3',5'-bis-trifluoromethylanilide 41 g. of 3-nitro-2,6-dihydroxy-benzoic acid-3',5'-bis-trifluoromethylanilide, 5 g. of anhydrous zinc chloride, 150 ml. of benzene and 55 g. of caproic acid chloride were heated together for 7 hours under reflux. The still hot solution was filtered and evaporated under reduced pressure. The residue was recrystallized from the same volume of diisopropyl ether. 30 g. of 3-nitro-2,6-dicapronyloxy-benzoic acid-3',5'-bis-trifluoromethylanilide were obtained. Melting point 95° C.

EXAMPLE 4

3-nitro-2,6-diacetoxy-benzoic acid-2',4',6'-trichloroanilide 95 ml. of acetanhydride were added dropwise, while stirring, to a mixture of 75 g. of 3-nitro-2,6-dihydroxybenzoic acid-2',4',6'-trichloroanilide, 160 ml. of tetramethylene-sulfone and 15 g. of anhydrous zinc chloride in such a manner that the temperature did not exceed 85° C. and the whole was further stirred for 3 hours at 85° C. After cooling, 600 ml. of water were added, whereupon an oil precipitated which solidified after about one hour. The crude product was filtered off with suction, washed with 300 ml. of water and recrystallized from methanol. 46 g. of 3-nitro-2,6-diacetoxy-benzoic acid-2',4',6'-trichloroanilide were obtained. Melting point 191° C.

EXAMPLE 5

3-nitro-2,6-dibenzoyloxy-benzoic acid-2',4',6'-trichloroanilide 90 ml. of tetramethylene-sulfone, 30 ml. of pyridine and 38 g. of 3-nitro-2,6-dihydroxy-benzoic acid - 2',4',6'-trichloroanilide were stirred together at 50° C. 34 g. of benzoyl chloride were added dropwise to the thus formed solution in such a manner that the temperature did not exceed 70° C. and the whole was further stirred for 2 hours at 50° C. After cooling, the whole was diluted with 450 ml. of water, the aqueous solution was decanted, boiled with 200 ml. of methanol and allowed to crystallize. The crystals that had precipitated were filtered off with suction, washed with 50 ml. of methanol and recrystallized from methanol. 46 g. of 3-nitro-2,6-dibenzoyloxy-benzoic acid-2',4',6'-trichloroanilide were obtained. Melting point 197° C. (decomposition).

EXAMPLE 6

3-nitro-2,6-di-(N-methyl-carbamyloxy)-benzoic acid 3',5'-bis-trifluoromethylanilide 45 g. of 3-nitro-2,6-dihydroxy-benzoic acid-3',5'-bis-trifluoromethylanilide, 350 ml. of acetone, 0.5 ml. of pyridine and 25 g. of methyl isocyanate were heated together for 10 minutes to 40° C. A solution formed at first and later on crystallization set in which was complete after 6 hours at room temperature. The crystals were filtered off with suction and washed with 80 ml. of acetone. 36 g. of 3-nitro-2,6-di-(N-methylcarbamyloxy)-benzoic acid-3',5' - bis - trifluoromethylanilide were obtained. Melting point 226° C. (decomposition).

EXAMPLE 7

3-nitro-2,6-bis-(N,N-diethyl-carbamyloxy)-benzoic acid-3',5'-bis-trifluoromethylanilide 45 g. of N,N-diethyl-carbamic acid chloride were added dropwise, while stirring, within 25 minutes, to 50 g. of 3-nitro-2,6-dihydroxy-benzoic acid - 3'5' - bis - trifluoromethylanilide in 135 ml. ofpyridine. The whole was stirred for 30 minutes at room temperature and for 3 hours at 70° C. After cooling, it was diluted with 800 ml. of water, the solid product was filtered off with suction, washed with 150 ml. of water and after drying, it was recrystallized from diisopropyl ether. 45 g. of 3-nitro-2,6-bis-(N,N-diethyl-carbamyloxy)-benzoic acid-3',5'-bis-trifluoromethylanilide were obtained. Melting point 139–141° C.

EXAMPLE 8

5-iodo-3-nitro-2,6-diacetoxy-benzoic acid-4'-chloroanilide (a) 30.8 g. of 3-nitro-2,6-dihydroxy - benzoic acid - 4'-chloroanilide, 230 ml. of glacial acetic acid and 16.2 g.

of iodine monochloride were heated together, while stirring, for 7 hours to 90° C. After cooling, the crystals that had separated were filtered off with suction and washed first with 50 ml. of glacial acetic acid and then with 50 ml. of methanol. 34.2 g. of 5-iodo-3-nitro-2,6-dihydroxy-benzoic acid-4'-chloroanilide were obtained. Melting point 190–191° C.

(b) 9.2 g. of 5-iodo-3-nitro-2,6-dihydroxy-benzoic acid-4'-chloroanilide, 25 ml. of acetanhydride and 2 g. of anhydrous zinc chloride were heated together for 20 minutes to 85° C. After cooling, the almost colorless crystals were filtered off with suction and washed with 8 ml. of methanol. 7.5 g. of 5-iodo-3-nitro-2,6 - diacetoxy - benzoic acid-4'-chloroanilide were obtained. Melting point 201° C.

EXAMPLE 9

3-nitro-2,6-bis-(furoyloxy)-benzoic acid-4'-bromoanilide 30 g. of furane-2-carboxylic acid chloride were added dropwise within 20 minutes, while stirring, to a mixture of 25 g. of 3-nitro-2,6-dihydroxy-benzoic acid-4'-bromoanilide, 70 ml. of tetramethylene-sulfone and 30 ml. of pyridine in such a manner that the temperature did not exceed 40° C. The whole was stirred for 2 hours at room temperature, diluted with 400 ml. of water, the aqueous solution was decanted and the oil that remained behind was stirred for 1 hour with 120 ml. of methanol, whereupon crystallization took place. The crystals were filtered off with suction and washed with 45 ml. of methanol. 30 g. of 3-nitro-2,6-bis-(furoyloxy)-benzoic acid-4' - bromoanilide were obtained. Melting point 191° C.

EXAMPLE 10

(a) 3-nitro-2,6-bis-(piperidino-carbonyloxy)-benzoic acid-3',5'-bis-trifluoromethylanilide 49 g. of piperidino-N-carboxylic acid chloride were added dropwise, while stirring, to 50 g. of 3-nitro-2,6-dihydroxy-benzoic acid-3',5'-bis-trifluoromethylanilide in 135 ml. of pyridine in such a manner that the temperature was maintained between 40 and 45° C. The whole was then stirred for 2 hours at 70° C., cooled, diluted with 750 ml. of water and the aqueous solution was decanted. The oil that remained behind was diluted with 100 ml. of ethanol and allowed to crystallize. The crystals were filtered off with suction and washed with 60 ml. of ethanol. 50 g. of 3-nitro-2,6-bis-(piperidino-carbonyloxy)-benzoic acid - 3',5' - bis - trifluoromethylanilide were obtained. Melting point 166° C.

In analogous manner there were obtained:

(b) 3-nitro-2,6-dibutyryloxy-benzoic acid-3',5'-bis-trifluoromethylanilide.

(c) 3-nitro-2,6-bis-cyclohexyloxy-benzoic acid-3',5'-bis-trifluoromethylanilide.

(e) 3-nitro-2,6-bis-pyrrolidino-carboxyloxy-benzoic acid-3',5'-bis-trifluoromethylanilide.

We claim:

1. A diacyloxy-benzoic acid anilide of the formula

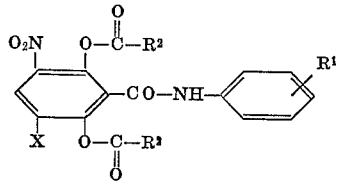

wherein X is hydrogen or halogen; $R^1$ is 1 to 3 members selected from the group consisting of trifluoromethyl and halogen; and $R^2$ is alkylamino or dialkylamino in which the alkyl groups each have from 1 to 4 carbon atoms, pyrrolidino, piperidino, morpholino, or N-methyl piperazino.

2. 3-nitro-2,6-di-(N-methylcarbamyloxy)-benzoic acid-3',5'-bis-trifluoromethylanilide.

3. 3-nitro-2,6-bis-(N,N - diethylcarbamyloxy) - benzoic acid-3',5'-bis-trifluoromethylanilide.

4. 3-nitro-2,6-bis-(piperidinocarbonyloxy)-benzoic acid 3',5'-bis-trifluoromethylanilide.

5. 3-nitro-2,6-bis-pyrrolidinocarbonyloxy-benzoic acid-3',5'-bis-trifluoromethylanilide.

References Cited

Christ et al.: Berlin. München Tierärztl. Wochenschr. 1970, 83(4), 61–5; Chem. Abstracts 73:12880g (1970).

Pfeiffer: Deut. Tierärztl Wochenschr. 1970, 77(5), 104–7; Chem. Abstracts 73:129196 (1970).

HENRY R. JILES, Primary Examiner

G. T. TODD, Assistant Examiner

U.S. Cl. X.R.

260—246 B, 268 C, 295 AM, 295.5 A, 302 H, 332.2 C, 326.3, 347.5, 468 R, 476 R, 479 R, 479 C, 479 S, 559 S; 424—248, 250, 263, 266, 267, 270, 274, 275, 285, 299, 300, 308, 311, 314